United States Patent [19]

Lech, Jr. et al.

[11] Patent Number: 4,548,302
[45] Date of Patent: Oct. 22, 1985

[54] TWO-STAGE CLUTCH DAMPER ASSEMBLY

[75] Inventors: Thaddeus Lech, Jr., Farmington Hills; Robert A. Frantz, Grosse Pointe Park, both of Mich.

[73] Assignee: Borg-Warner Corporation, Chicago, Ill.

[21] Appl. No.: 556,519

[22] Filed: Nov. 30, 1983

[51] Int. Cl.⁴ .............................................. F16D 3/12
[52] U.S. Cl. ........................ 192/106.2; 192/70.16; 192/70.17; 192/106.1; 464/68
[58] Field of Search ............ 192/30 V, 70.16, 70.17, 192/70.19, 106.1, 106.2; 464/66, 67, 68, 149, 150

[56] References Cited

U.S. PATENT DOCUMENTS

| | | | |
|---|---|---|---|
| 2,276,416 | 3/1942 | Nutt | 192/68 |
| 3,066,780 | 12/1962 | Blau | 192/70.16 |
| 3,181,673 | 5/1965 | Poliseo | 192/103 |
| 3,299,671 | 1/1967 | DeCastelet | 464/68 |
| 3,362,194 | 1/1968 | Bertelson et al. | 192/106.2 |
| 3,556,273 | 1/1971 | Maucher | 192/106.2 |
| 3,809,198 | 5/1974 | Mori | 192/106.2 |
| 4,270,645 | 6/1981 | Beccaris | 192/106.1 |
| 4,418,812 | 12/1983 | Lech, Jr. | 192/106.2 |
| 4,446,955 | 5/1984 | Lech, Jr. | 192/106.2 |

FOREIGN PATENT DOCUMENTS

| | | | |
|---|---|---|---|
| 1285339 | 12/1968 | Fed. Rep. of Germany ... | 192/106.1 |
| 968623 | 9/1964 | United Kingdom ............ | 192/106.1 |

Primary Examiner—Stephen F. Husar
Attorney, Agent, or Firm—James A. Geppert

[57] ABSTRACT

A two-stage clutch damper assembly for use in an automotive vehicle adapted to dissipate the irregular impulses of a vehicle diesel engine when the transmission is in neutral, the clutch is engaged and the engine is at idle rpm. The assembly includes a clutch plate, a spring retainer plate secured to the clutch plate, and a main hub in operative engagement with the transmission input shaft and having an integral hub flange with spring notches opened to allow an additional rotational travel of the clutch and spring retainer plates relative to the hub. An intermediate hub has a radial flange between the clutch plate and main hub and an inner hub is concentric in said intermediate hub and spring-biased away from said main hub. The inner hub is splined onto the transmission input shaft, and the inner and intermediate hubs have interengaging helical teeth so that rotary motion of said intermediate hub results in axial movement of said inner hub.

7 Claims, 10 Drawing Figures

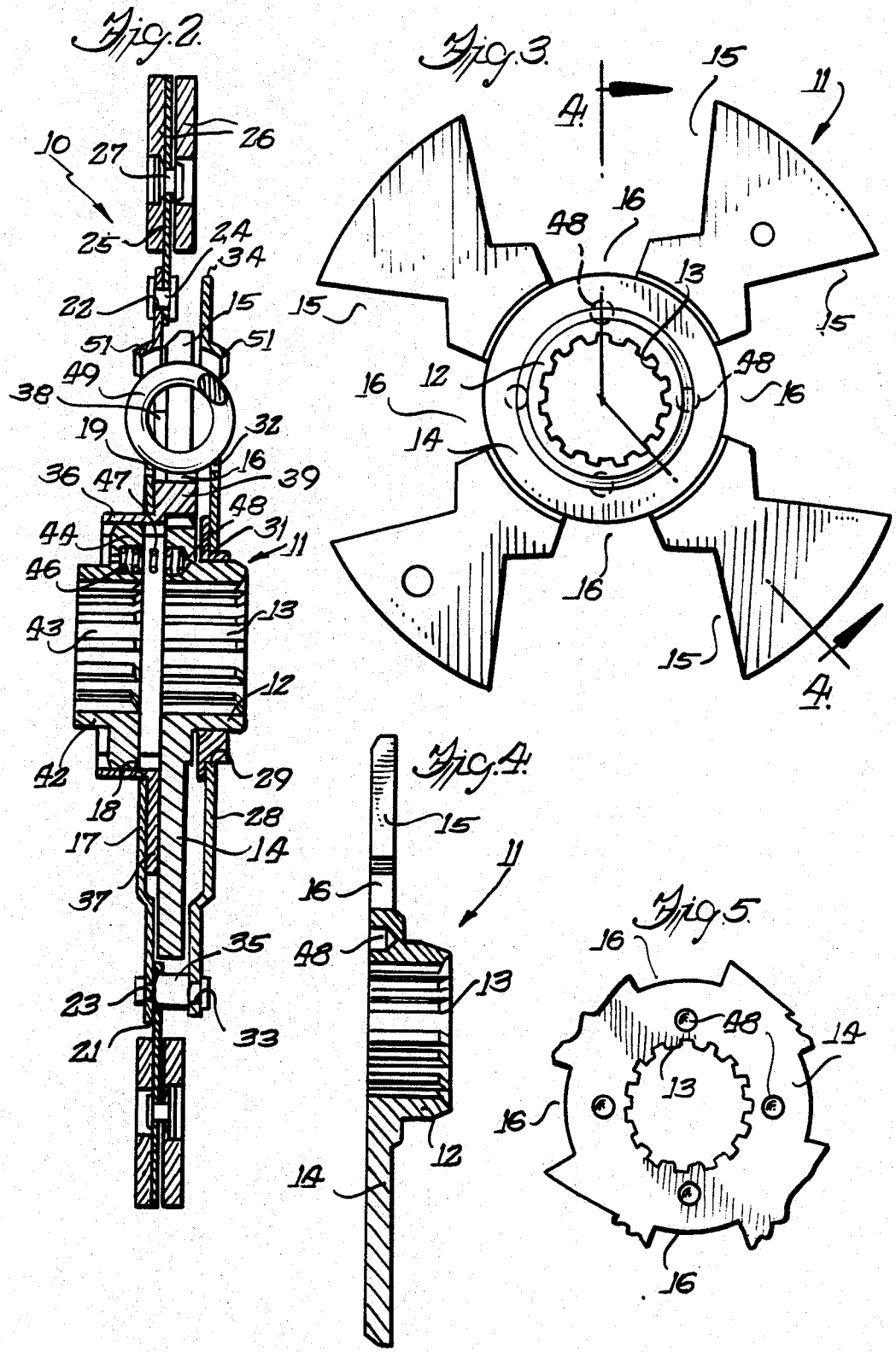

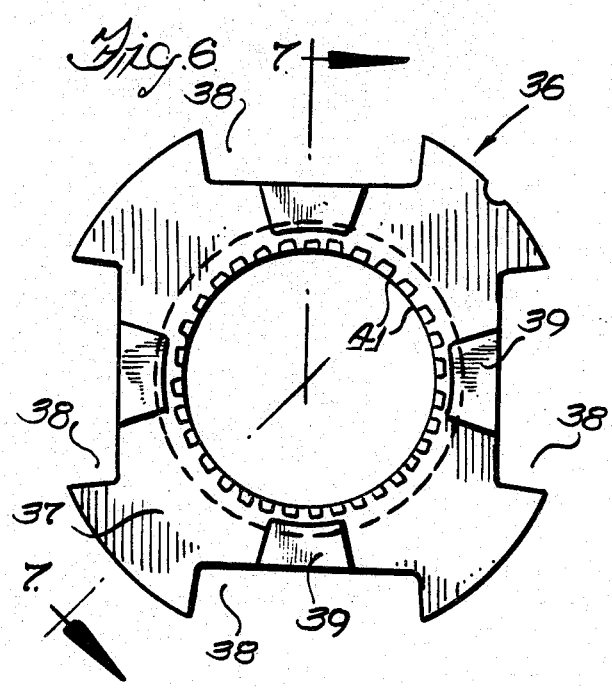
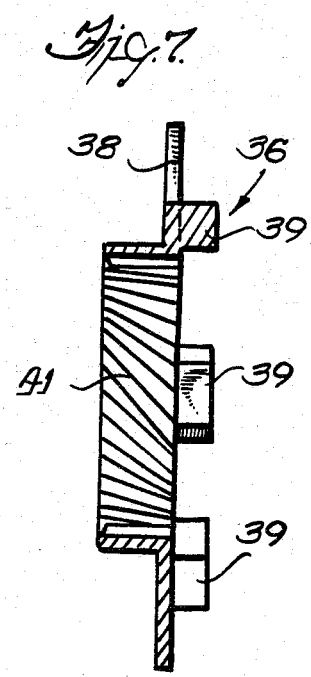
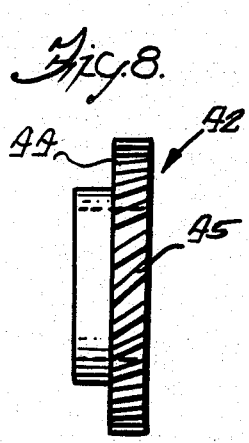
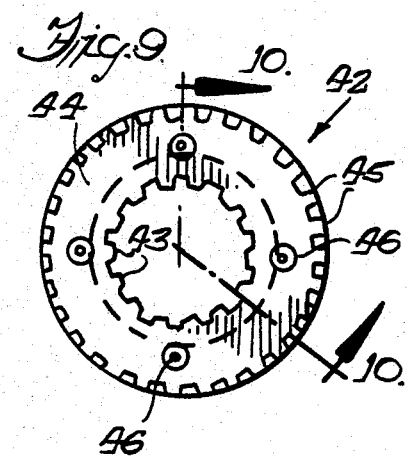
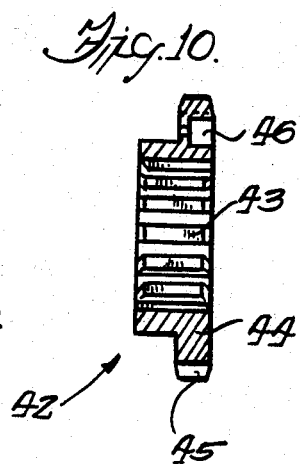

TWO-STAGE CLUTCH DAMPER ASSEMBLY

BACKGROUND OF THE INVENTION

In a conventional friction clutch for the drive train of an automotive vehicle, the engine has power and inertia impulses which drive the engaged clutch with an irregular series of thrusts when the transmission is in neutral and the engine is at idle rpm. These impulses will be transmitted through the input shaft to the transmission gears which become excited, resulting in oscillation through their backlash space to produce objectionable rattle. In the copending application Ser. No. 212,925, now U.S. Pat. No. 4,446,955, a clutch driven plate assembly is disclosed utilizing a helical connection between an inner hub and an outer hub to allow relative axial movement between the hubs to dissipate the engine impulses. The present invention relates to another approach to this problem to simplify construction of the clutch assembly.

SUMMARY OF THE INVENTION

The present invention comprehends the provision of a two-stage clutch damper assembly having a novel multiple hub arrangement in conjunction with the clutch plates to dissipate engine impulses which had previously resulted in objectionable transmisson gear rattle with the clutch engaged, the transmission in neutral and the engine at idle rpm. The hub arrangement includes a main hub barrel in operative engagement with the transmission input shaft and an integral radial flange with enlarged spring windows relative to the spring windows formed in the clutch and spring retainer plates; the clutch plate carrying the clutch friction facings at its periphery. An intermediate hub is provided with a flange located between the clutch plate and main hub and an inner hub is concentric within the intermediate hub and splined on the input shaft for axial reciprocatory movement upon rotation of the intermediate hub.

The present invention also comprehends the provision of a two-stage clutch damper assembly having a novel camming arrangement including a main hub having an integral flange with enlarged spring windows for both the drive and coast directions relative to the windows in the clutch and spring retainer plates, an inner hub in splined engagement with the transmission input shaft and an intermediate hub with a lost motion connection to the hub flange. The inner and intermediate hubs have complementary interengaging helical gear teeth so that relative rotation between the plates and hub results in axial movement of the inner hub during idling. Compression springs are interposed between the inner hub and the main hub to yieldably resist movement of the inner hub towards the main hub with the springs being 90° out of plane with the normal damper springs.

The present invention further comprehends the provision of helical teeth between the inner and intermediate hubs to eliminate the "in plane" space which occurs when the inner hub goes into float with high frequency, high amplitude excitation typical in diesel engine drivelines. The helical teeth on the intermediate hub mesh to trap the helical teeth on the inner hub so that no "in plane" space can occur and the inner hub cannot go into float as it is mechanically driven to follow the action of the intermediate hub. This improved design also has lugs to drive the intermediate hub when the normal damper operates so that the helical teeth will not be stripped and so that the inner hub will not be driven forward out of engagement with the intermediate hub.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the assembly taken on the irregular line 2—2 of FIG. 1.

FIG. 3 is a rear elevational view of the main hub utilized in the present assembly.

FIG. 4 is a cross sectional view of the hub taken on the irregular line 4—4 of FIG. 3.

FIG. 5 is a partial front elevational view of the hub.

FIG. 6 is a rear elevational view of the intermediate hub of the present assembly.

FIG. 7 is a cross sectional view taken on the irregular line 7—7 of FIG. 6.

FIG. 8 is a side elevational view of the inner hub of the present assembly.

FIG. 9 is a rear elevational view of the inner hub of FIG. 8.

FIG. 10 is a cross sectional view taken on the irregular line 10—10 of FIG. 9.

DESCRIPTION OF THE PREFERRED EMBODIMENT

Figure 1:
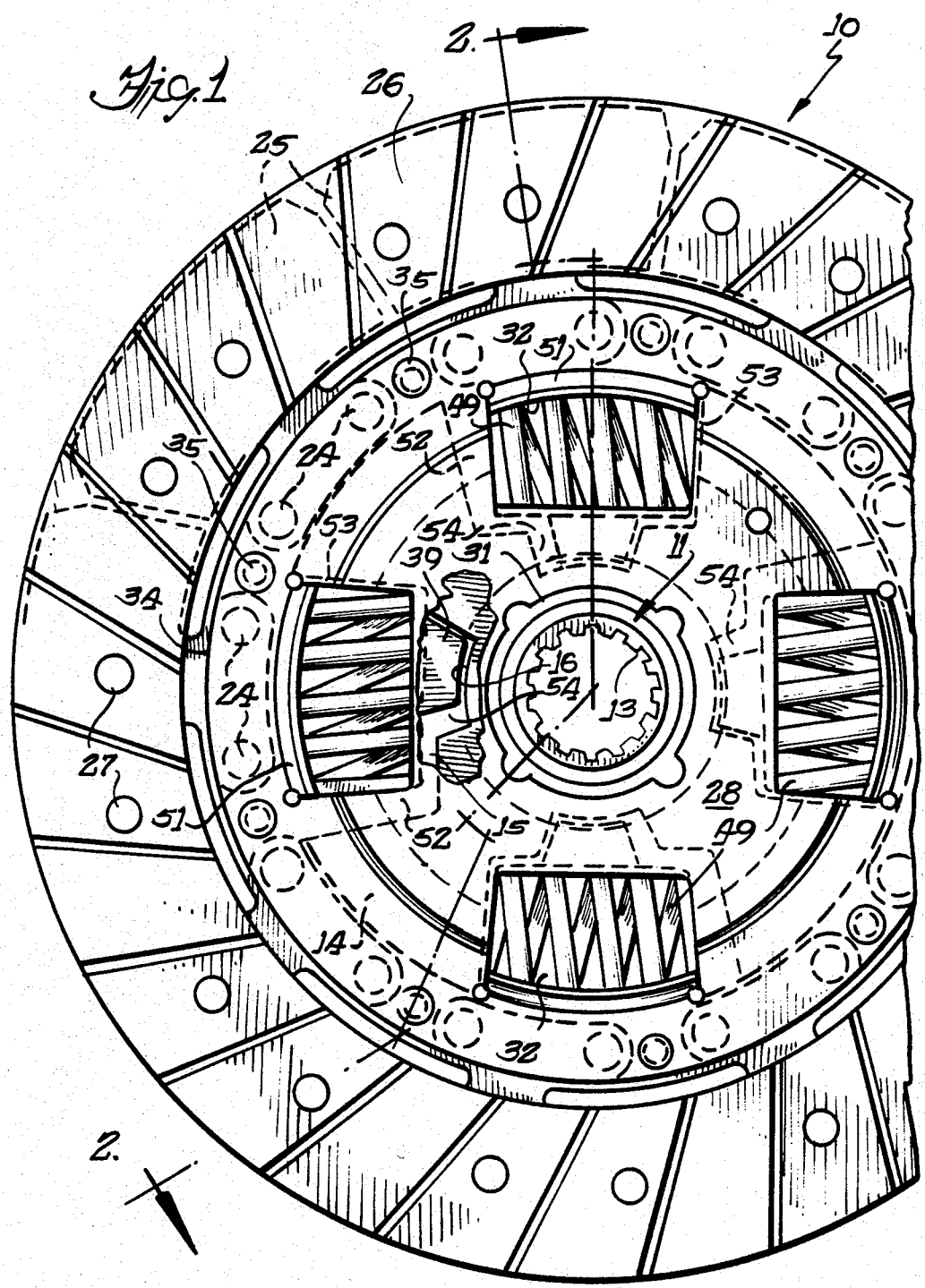
FIG. 1 is a rear elevational view with portions broken away of a two-stage clutch damper assembly embodying the present invention.

Referring more particularly to the disclosure in the drawings wherein is shown an illustrative embodiment of the present invention, FIGS. 1 and 2 disclose a two-stage clutch damper assembly 10 including a main hub member 11, a clutch plate 17 carrying friction facings 26 mounted on the periphery thereof and adapted to be positioned between friction surfaces of a flywheel and a pressure plate (not shown) for the vehicle clutch, and a spring retainer plate 28. The hub member 11 (FIGS. 3, 4 and 5) includes a barrel 12 with a splined central opening 13 receiving the splined end of a transmission input shaft (not shown) and an integral radial flange 14 having a plurality of circumferentially equally spaced arcuate notches 15, and each notch has a radially inwardly extending arcuate slot 16 adjacent the barrel 12 for a purpose to be later described.

The clutch driven plate 17 has a central opening 18, a plurality of circumferentially equally spaced spring windows 19, and a plurality of openings 22 and 23 adjacent the periphery 21 of the plate. The openings 22 receive rivets 24 for securement of cushioning plates 25 carrying the opposed friction facings 26 for the clutch secured thereto by rivets 27.

The spring retainer plate 28 has a central opening 29 to receive a piloting bushing 31 journalled on the hub barrel 12, a plurality of circumferentially equally spaced arcuate spring windows 32 axially aligned with the notches 15 and windows 19 of the hub and clutch plate, respectively, and a plurality of openings 33 in the periphery 34 thereof axially aligned with openings 23 to receive spacer rivets 35 to secure the clutch plate 17 and spring retainer plate 28 together; the rivets being positioned radially beyond the periphery of the hub flange 14 (FIGS. 1 and 2). The piloting bushing 31 is utilized so that the hub is piloted concentric in the assembly. The bushing or spacer may be formed of a suitable plastic material and, although not shown, one or more friction washers may be located between the hub flange and bushing if additional frictional lag force is desired.

A circular intermediate hub member 36 (FIGS. 6 and 7) is positioned concentrically within the central opening 18 of the clutch driven plate 17 and has a radial flange 37 at the rear edge with circumferentially equally spaced notches 38, and a rearwardly extending lug 39 radially aligned with each notch. The internal surface of the member is provided with left hand 45° helical teeth 41 acting to cooperate with mating external left hand helical teeth 45 on an inner hub member 42.

The inner hub member 42 (FIGS. 8, 9 and 10) is generally cylindrical with internal axial splines 43 receiving the splined end of the input shaft and has a radial flange 44 with the helical teeth 45 formed on the periphery thereof. Also formed in the flange are spaced pockets 46 to receive compression springs 47 extending into spring recesses or pockets 48 formed in the hub member 11 facing and axially aligned with the pockets 46. These springs 47 serve the dual function of normally biasing the hub member 11 and inner hub member 42 apart and of aligning the splines 13 and 43 in the central openings of the hub barrel 12 and inner hub member 42, respectively.

One or more concentric damper springs 49 are located in each aligned set of spring windows 19 and 32 in the plates and notches 15 in the hub flange, with the plate windows 19 and 32 having inwardly inclined lips 51 to retain the springs in operative position. As seen in FIG. 1, the notches 15 in the hub flange are enlarged relative to the clutch and spring retainer plate windows in the drive direction at 52 and by a smaller amount in the coast direction at 53. The function of the enlarged windows will become more apparent when considering operation of the assembly. The springs 47 are 90° out of plane with the normal damper springs 49 to break up harmonic influence and resonance by changing the plane of motion. Also, the lugs 39 project into the arcuate slots 16 and are of such dimensions as to provide a lost motion space 54 (FIG. 1) for a purpose to be later described.

In the normal position of the hub assembly with the clutch disengaged, as seen in FIG. 2, the springs 47 urge the inner hub member 42 forwardly away from the hub member 11 with the helical teeth fully engaged, and the notches 38 on the intermediate hub member 36 encompassing the damper springs 49. This clutch assembly operates in the same manner as a conventional assembly except for the action of the hub members 36 and 42 at idle rpm and in neutral transmission position. With the clutch engaged between the flywheel and pressure plate, the engine impulses during idle act to rotate the clutch plate 17, spring retainer plate 28 and damper springs 49 relative to the hub member 11 due to the enlarged portion 52 of the spring notches 15, with the intermediate hub member 36 being rotated by the damper springs 49 located within the notches 38. The mating helical teeth, upon rotation of member 36 causes the inner hub member 42 rearwardly on the transmission input shaft against the force of the compression springs 47, with the lugs 39 moving in the spaces 54 in the arcuate slots 16. Movement continues until the damper springs strike the ends of the enlarged portion of the hub flange spring windows. The energy of the impulses is used to actuate the inner hub member in the above manner rather than transmit the undiminished impulses to the vehicle transmission to cause its gears to rattle. In the normal driving mode of the vehicle, movement of the lugs 39 in the slots 16 is timed to drive the intermediate hub 36 in the same rotational direction as the inner hub member 42 when the normal damper operates so that the helical teeth will not be stripped or the inner hub member will not be driven out the end of the intermediate hub member 36.

This assembly eliminates the "in plane" space which occurs when the cam of Case 082002-BB goes into float with high frequency, high amplitude excitation typical in drivelines with diesel engines. When the cam goes into float, the device can establish a state of resonance through the "in plane" space between the cam and ramp surfaces as they become disengaged. The helical intermediate hub teeth mesh to trap the helical inner hub teeth so that no "in plane" space can occur and so that the inner hub cannot go into float since it is mechanically driven to follow the action of the intermediate hub.

We claim:

1. A two-stage clutch damper assembly for an automotive vehicle clutch driving a transmission input shaft, including a hub assembly having a main hub barrel splined onto the input shaft and an integral radial flange with equally spaced peripheral notches, a clutch plate carrying friction facings at the outer periphery thereof, a spring retainer plate secured to the clutch plate to sandwich said hub flange therebetween, said plates having sets of circumferentially spaced windows therein axially aligned with said hub flange notches, and damper springs received in each set of windows and notches, the improvement comprising an inner hub splined onto said input shaft and an intermediate hub having a radial flange located between said clutch plate and main hub, said hub flange notches extending circumferentially beyond said plate windows to allow limited rotation of said plates relative to said hub without compression of said damper springs, and said inner and intermediate hubs having interengaging helical teeth causing axial movement of said inner hub upon rotation of said intermediate hub.

2. A two-stage clutch damper assembly as set forth in claim 1, wherein said intermediate hub flange terminates in a periphery with notches encompassing said damper springs so that rotation of said plate and damper springs relative to said main hub causes rotation of said intermediate hub.

3. A two-stage clutch damper assembly as set forth in claim 2, including axially aligned facing pockets formed in said inner hub and main hub, and compression springs received in said pockets biasing said inner hub and main hub apart.

4. A two-stage clutch damper assembly as set forth in claim 1, in which said hub flange notches have arcuate slots located radially inwardly of the notches, and rearwardly extending lugs formed on said intermediate hub flange and projecting into said slots.

5. A two-stage clutch damper assembly as set forth in claim 4, in which said arcuate slots extend circumferentially beyond said lugs in one direction to allow for limited lost motion when said plates rotate relative to said main hub.

6. A two-stage clutch damper assembly as set forth in claim 5, wherein said interengaging helical teeth are left-handed at 45°.

7. A two-stage clutch damper assembly as set forth in claim 6, wherein said inner hub has a radial flange terminating in said helical teeth.

* * * * *